United States Patent [19]
Coffey

[11] 3,731,253
[45] May 1, 1973

[54] SNAP-ON TERMINAL ASSEMBLY FOR METER SOCKETS

[75] Inventor: William F. Coffey, Stratford, Conn.

[73] Assignee: Westinghouse Electric Corporation, Pittsburgh, Pa.

[22] Filed: Feb. 3, 1972

[21] Appl. No.: 223,155

[52] U.S. Cl..........339/217 S, 339/31 M, 339/198 M
[51] Int. Cl. ...............................................H01r 9/08
[58] Field of Search......................339/198 M, 31 M, 339/219, 217, 214, 215; 317/104, 105, 106, 107, 108, 109, 110, 111

[56] References Cited

UNITED STATES PATENTS 3,187,296  6/1965  Brackett............................339/217 S
3,394,340  7/1968  Kobryner...........................339/217 R

OTHER PUBLICATIONS

Electrical World, "Square Meter Socket" Oct. 10, 1960, Gen. Electric.
Electrical World, "Ringless Sockets" March 13, 1961, Gen. Electric.

Primary Examiner—Ernest R. Purser
Assistant Examiner—Robert A. Hafer
Attorney—A. T. Stratton et al.

[57] ABSTRACT

A snap-on terminal assembly for a meter socket includes a retaining clip fastened to the bottom of an auxiliary jaw terminal. The retaining clip includes a flat base with an offset cantilever projection for supporting the auxiliary jaw terminal above the base. An integral tab on the base projects toward the free end of the cantilever projection. The retaining clip holds the auxiliary jaw terminal in a clamped relationship on the face of the meter socket base when the retaining clip base is positioned on the back of the meter socket base and the tab is received by a meter socket hole.

7 Claims, 5 Drawing Figures

Patented May 1, 1973

3,731,253

SNAP-ON TERMINAL ASSEMBLY FOR METER SOCKETS

BACKGROUND OF THE INVENTION

This invention is related to a snap-on terminal assembly for a meter socket and more particularly to an improved terminal assembly of the auxiliary of fifth jaw type intended to be installed on a meter socket under field service conditions.

Meter sockets typically used for mounting and making electrical connection to electric meters of the watthour type, for example, include an insulating base which supports jaw terminals which mate with the blade terminals extending from the meter enclosure. Two pairs of jaw terminals are usually mounted to the insulating base in a fixed relationship for connection to the power line service conductors or to metered branch circuits of an electrical distribution network at one location. The types of electrical service may vary between the so-called two wire, three wire or four wire distribution systems. This requires corresponding meter types having different numbers of blade terminals for appropriate connection to a particular distribution system. To provide the correct connection, it is necessary to provide additional or auxiliary jaw terminals on the meter socket insulating base, often referred to as fifth jaw terminals, to receive the corresponding number of blade terminals of the required meter.

Electric utility companies and electrical equipment suppliers commonly stock basic meter socket types which can be modified by adding additional jaw terminals at the time of installation. Accordingly, it is desirable that an auxiliary terminal be provided for easy and quick attachment to a meter socket under field service conditions and is simply and inexpensively manufactured while maintaining the reliable extended service life typically required for meter sockets.

BRIEF DESCRIPTION OF THE INVENTION

In accordance with this invention, a snap-on terminal assembly for a meter socket includes a retaining clip for attaching an auxiliary jaw terminal adjacent the edge of a meter socket insulating base. The insulating base includes a mounting area for receiving the assembly and has a slot extending into the edge thereof and a hole aligned with the end of the slot. The retaining clip includes a flat base and an integral offset cantilever projection insertable within the slot to provide a terminal support surface substantially coplanar with the face of the insulating base. The auxiliary jaw terminal is fastened to the cantilever projection so as to rest on the area of the face of the insulating base adjacent the slot when the base of the retaining clip slidingly engages the back of the insulating base. A tab formed at the end of an opening formed by the cantilever projection projects toward the free end of the cantilever projection and is oriented so as to extend into the insulating base hole. The snap-on terminal assembly is then secured in clamping engagement with the face and back of the insulating base. The tab is yieldable so that it may be bent toward the base of the clip and out of the insulating base hole to permit removal of the snap-on terminal assembly.

Another feature of this invention is a snap-on terminal assembly that is simply and easily attached to the insulating base of a meter socket without the use of tools. It is a further important feature of this invention that the retaining clip for supporting an auxiliary jaw terminal on the insulating base so as to be releasable for ease in removing the assembly from the insulating base. A still further feature of this invention includes the mounting of the snap-on terminal assembly so that it is slightly shiftable on the face of the insulating base to accommodate simultaneous mating of several jaw terminals, including the auxiliary jaw terminal, with the blade terminals of a meter.

DESCRIPTION OF THE PREFERRED EMBODIMENT

Figure 1:
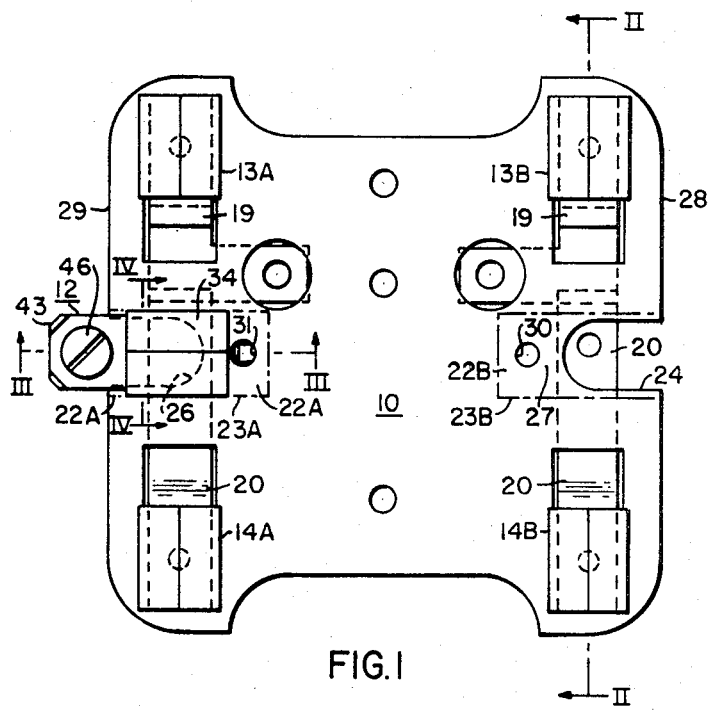
FIG. 1 is a top plan view of an insulating base for a meter socket including the snap-on terminal assembly of this invention.
Figure 2:
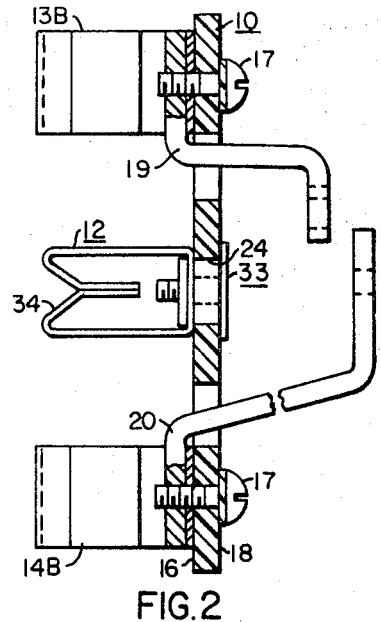
FIG. 2 is a cross-sectional view of the insulating base shown in FIG. 1 taken along the axis II—II and looking in the direction of the arrows.

Referring now to the drawing wherein the same numeral is used to designate the same or similar part and more particularly to FIGS. 1 and 2 wherein a top plan view and an end cross-sectional view of an insulating base 10 are illustrated. A snap-on terminal assembly 12 made in accordance with a preferred embodiment of this invention is shown mounted on the insulating base 10 which includes a thin generally square, block of insulation material. The insulating base 10 is of a type used in meter sockets, not shown, which typically receive a watthour type integrating electric meter and is well-known to those skilled in the art. First and second pairs of jaw terminals 13A–13B and 14A–14B are fixedly secured to the face 16 of the insulating base 10 by a suitable arrangement including machine screws 17 applied through the back 18 of the insulating base 10 as shown in FIG. 2. The screws 17 are threaded to lug connectors indicated by numerals 19 and 20 in FIG. 2 which extend over the bottom of one jaw terminal of each pair, 13B and 14B, for example, and extend through the insulating base 10 to make connection with bus bars or other conductors connectable with the line and load conductors of an electrical service or power distribution subsystem. The pairs of jaw terminals 13A–13B and 14A–14B are of the conventional type including opposing resilient prongs which receive the blade terminals provided on electric meters of the type including watthour meters.

To accommodate either one or two of the snap-on terminal assemblies 12 in addition to the pairs of jaw terminals 13A–13B and 14A–14B, identical auxiliary terminal mounting areas 22A and 22B are provided on the insulating base 10 as indicated by the phantom lines 23A and 23B illustrated at the left hand and right hand sides of the insulating base 10 in FIG. 1. The mounting area 22A is partially covered by the single snap-on terminal assembly 12 illustrated mounted on the insulating base 10 so that it is positioned between the jaw terminals 13A and 14A.

Figure 3:
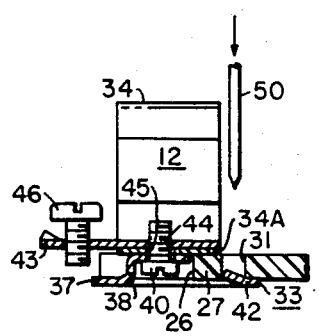
FIG. 3 is a cross-sectional view of the insulating base taken along the axis III—III in the plane of the center longitudinal axis of the snap-on terminal assembly of this invention and looking in the direction of the arrows III—III.

Each of the aforementioned mounting areas 22A and 22B includes U-shaped slots 24 and 26, respectively, extending substantially perpendicular into the side edges 28 and 29, respectively of the insulating base 10. The side walls of the slots 24 and 26 are substantially parallel and are terminated by a substantially semicircular closed end. Circular holes 30 and 31 are provided through the mounting areas 22A and 22B, respectively in spaced relationship on the closed ends of each of the slots 24 and 26, respectively. This defines bridging areas 27, shown in FIG. 3, and 28, shown in FIG. 1 between each hole and the associated slot. The holes 30 and 31 are positioned substantially in alignment with a longitudinal axis of each of the slots in the manner that the hole 30 is shown aligned with the axis 24A of the slot 24.

Figure 4:
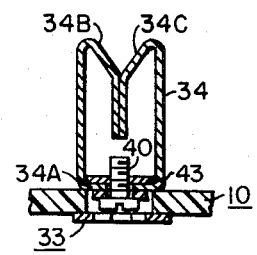
FIG. 4 is a cross-sectional view of FIG. 1 taken along the axis IV—IV in a transverse plane through the snap-on terminal assembly of this invention and looking in the direction of the arrows.
Figure 5:
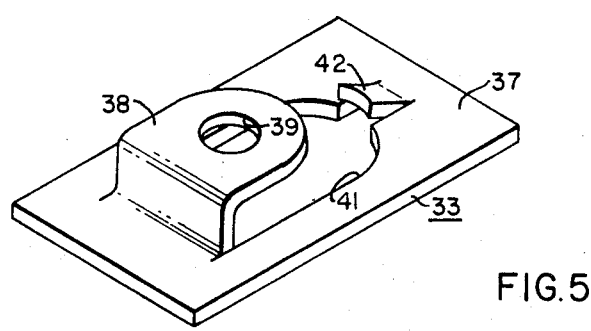
FIG. 5 is a perspective view of a retaining clip for the snap-on terminal assembly made in accordance with this invention.

Referring now in detail to the snap-on terminal assembly 12 shown in the cross-sectional views of FIGS. 3 and 4 and the perspective view of FIG. 5 illustrating a retaining clip 33 which provides an important feature of this invention for fastening the terminal assembly 12 to the insulating base 10. An auxiliary jaw terminal 34 of the terminal assembly 12 corresponds to the aforementioned type utilized for the pairs of jaw terminals 13A–13B and 14A–14B which receive blade terminals of a watthour meter. As shown in FIGS. 2, 3 and 4, the rearward part 34A of the jaw 34 is substantially flat and the opposing prong parts 34B and 34C extend therefrom. In accordance with this invention the width of the slots 24 and 26 is made slightly narrower than the width of the rearward part 34A of the jaw terminal 34 so that it overlaps the side walls of the slot when mounted on the insulating base 10.

The retaining clip 33 is made of a thin strip of resilient sheet metal material in the preferred embodiment illustrated. The body of the clip 33 includes a flat substantially rectangular base 37. An offset cantilever projection 38 is formed by a die cutting and pressing method of manufacture so as to extend in a substantially parallel and spaced relationship from the base 37. The outer side of the projection 38 is spaced a distance from the base 37 by a distance substantially equal to the thickness of the insulating base 10. The portion of the projection 38 extending parallel to the base 37 defines a support surface for the terminal 33 and has a hole 39 provided for receiving a screw 40 which is shown in FIGS. 3 and 4. The width of the cantilever projection 38 is slightly less than the width of the slots 24 and 26 and the end of the cantilever projection 38 is substantially semicircular so that it has a reduced complementary configuration to the U-shaped configuration of the slots 24 and 26 in the plane parallel to the face 16 of the insulating base 10. This permits a floating or shifting relationship between the snap-on terminal assembly 12 and the insulating base 10 as described more fully hereinbelow.

An integral tab 42, best seen in FIGS. 3 and 5, is formed by a pair of parallel slits extending from the semicircular end of a U-shaped opening 41 formed in the clip base 37 by the offset projection 38. The free end of the tab 42 is pressed away from the base 37 so as to be directed toward the free end of the cantilever projection 38 which extends from an opposite end of the opening 41. Accordingly, the free ends of the cantilever projection 38 and of the tab 42 are in facing relationship and spaced apart in a symmetrical relationship along the center longitudinal axis 37A of the base 37 a distance slightly more than the length of the bridging areas 27 and 28. The length and width of the tab 42 are smaller than the diameter of the holes 31 and 32 so as to be receivable therein as shown in FIG. 3. The tab 42 may be formed in a single die stamping operation which also forms the cantilever projection 38 and opening 41.

For making electrical connection between the conductors of the meter socket and the auxiliary jaw terminal 34, the assembly 12 includes a strip connector 43. The strip connector 43 is formed to rest on the forward side of the rearward part 34A of the jaw terminal 34 and has a threaded hole 44 for receiving the screw 40. The outer end of the strip connector 43 includes a second threaded hole 45 for receiving a terminal screw 46 for clamping a lug or exposed metal of a wire conductor.

The parts of the snap-on terminal assembly 12 are assembled together by positioning the axial jaw terminal 34 on the cantilever projection 38 so that a hole 45 in the rearward part 34A of the jaw terminal 34 is aligned with the hole 39. The strip connector 43 is positioned so that the hole 44 thereof also aligns with the holes 39 and 45 and the screw 40 is threaded to the hole 44 so as to clamp the auxiliary terminal 34 between the strip connector 43 and the retaining clip 33. This forms the assembly 12 in an integral unit which is simply and easily fastened to the insulating base 10 as described hereinbelow.

By way of example and not limitation the dimensions included in the auxiliary terminal mounting areas 22A and 22B on the insulating base 10 and the dimensions of the retaining clip 33 are described to further illustrate the relationship therebetween for mounting of the snap-on terminal assembly 12 to the insulating base 10 in accordance with this invention. The length of the slots 24 and 26 are in the order of 0.69 inch and the widths are in the order of 0.50 inch. The holes 30 and 31 have a diameter of 0.25 inch and the centers are spaced by the bridging areas 27 and 28 along the slot center longitudinal axes 0.125 inch from the closed ends of each slot. In one preferred embodiment, the insulating base 10 is made of a glass filled polyester material having a thickness of 0.156 inch. In the retaining clip 33 which is made of a strip of sping steel material of 0.046 thickness, the base 37 has a length in the order of 1.18 inch and a width in the order of 0.625 inch. The cantilever projection 38 is spaced 0.16 inch from the surface of the base 37 and has a width in the order of 0.38 inch. The sides of the tab 39 are in the order of 0.17 inch and the free end of the tab and the free end of the cantilever projection 38 are spaced apart 0.17 inch along a plane parallel to the face 16 of the insulating base.

To assemble the snap-on terminal assembly 12 to the insulating base 10, the terminal assembly 12 is aligned with one of the slots such as 26 so that the free end of the cantilever projection 38 is receivable by the selected slot. The base 37 of the retaining clip 33 slides along the back 18 of the insulating base 10 adjacent the side walls of the slot 26. As the terminal assembly 12 is pressed further into the insulating base 10, the back of rearward part 34A the jaw terminal 34 engages the face 16 of the insulating base 10. The tab 42 is resiliently yieldable so that the free end thereof is pressed toward the retaining clip base 37 as it slides over the back of the bridging area 27 after passing the end of the slot 26. Upon the free end of the tab 42 reaching the edge of the hole 31, it is resiliently biased back to the original position so as to be trapped within the sides of the hole 31. This secures the terminal assembly 12 to the insulating base 10 without use of any tools in a simple manner when assembly may be required through a meter opening of a meter socket housing.

The mounting area 22A of the insulating base 10 adjacent slot 26 is clamped between the rearward part 34A of the jaw terminal 34 and the base 37 of the retaining clip 33. With the tab 42 positioned within the hole 31 a cooperative lateral clamping relationship exists with the vertical clamping relationship described above to retain the snap-on terminal assembly 12 on the insulating base 10. The cantilever projection 38 is held within and is spaced slightly from the side walls of the slot 26 so that the terminal assembly 12 is slightly shiftable about the hole 31 to accommodate the mating relationship between the blade terminals of a meter inserted into the meter sockets and the pairs of jaw terminals 13A–13B and 14A–14B as well as the jaw terminal 34. The lateral pivoting and sliding movement of the terminal assembly 12 is limited by engagement of the side edges of the cantilever projection 38 with the side walls of the slot 26.

The snap-on terminal assembly 12 is simply removed from the insulating base 10, in accordance with a further important feature of this invention, by inserting a rod like tool 50, shown in FIG. 3, into the hole 31 from the face 16 of the base 10. The end of the tool is pressed against the free end of the tab 38 so that it is resiliently bent toward the base 37 and below the back 18 of the base 10. The terminal assembly 10 is then free to be removed by slidingly withdrawing the cantilever projection 38 from a slot 26 to release the insulating base from the clamping position between the bottom of the auxiliary jaw terminal 34 and the base 37 of the retaining clip 33.

While a preferred embodiment of the snap-on terminal assembly 12 has been described hereinabove, it is apparent that modifications may be made in accordance with the spirit and scope of this invention.

What is claimed is:

1. A snap-on terminal assembly for a meter socket, said assembly comprising:
   a jaw terminal for receiving a mating blade terminal of an electric meter;
   an electrical connector means for conducting current to said jaw terminal;
   and a retaining clip for releasably attaching said assembly to an insulating base of said meter socket, said retaining clip including a flat base and an offset cantilever projection supporting a rearward part of said jaw terminal, said cantilever projection being receivable by a slot extending into one edge of said insulating base when said jaw terminal is positioned on the face of said base and concurrently said base of said retaining clip engages the back of said insulating base, said retaining clip further including a yieldable tab extending from said base toward the free end of said cantilever projection, said tab being receivable by a hole in said insulating base so as to retain said cantilever projection within said slot of said insulating base and thereby maintain the position of said jaw terminal on said insulating base.

2. The snap-on terminal assembly as claimed in claim 1 including a fastener means for clamping said jaw terminal between said electrical connector means and said cantilever projection.

3. A snap-on terminal assembly as claimed in claim 1 wherein said retaining clip is formed of an integral strip of spring steel material.

4. An insulating base for a meter socket, said insulating base comprising:
   a mounting area on said base for supporting an auxiliary jaw terminal, said area including a closed slot extending into one edge of said insulating base, said area further including a hole extending through said insulating base adjacent the closed end of said slot;
   a retaining clip for releasably fastening a jaw terminal to said insulating base, said retaining clip including a flat base, an offset cantilever projection part and a yieldable tab part with said parts having free ends extending from one side of said base of said clip in facing relationship, said cantilever projection part being insertable into said slot when supporting said jaw terminal on one side of said mounting area of insulating base with said base of said retaining clip engaging the opposite side of said mounting area, said tab being receivable by said hole when said cantilever projection is insertably positioned within said slot.

5. An insulating base as set forth in claim 4, wherein said cantilever projection is substantially parallel to said base thereof and includes side edges spaced from the side walls of said slot of said mounting area to permit limited free movement of said auxiliary jaw terminal on said insulating base.

6. An insulating base as set forth in claim 4, including first and second pairs of jaw terminals fixedly attached to said insulating base and wherein said mounting area is positioned between a jaw terminal of said first pair and a jaw terminal of said second pair.

7. The insulating base as claimed in claim 6, wherein said hole in said mounting area is excessible at said one side of said mounting area so as to expose said tab for engagement by a tool insertable into said hole for applying bending movement to said tab in a direction away from said hole so as to release said retaining clip from said insulating base.

* * * * *